United States Patent [19]

Carey et al.

[11] Patent Number: 5,399,247
[45] Date of Patent: Mar. 21, 1995

[54] METHOD OF ELECTROLYSIS EMPLOYING A DOPED DIAMOND ANODE TO OXIDIZE SOLUTES IN WASTEWATER

[75] Inventors: James J. Carey, West Henrietta; Charles S. Christ, Jr.; Stephen N. Lowery, both of Fairport, all of N.Y.

[73] Assignee: Eastman Kodak Company, Rochester, N.Y.

[21] Appl. No.: 172,514

[22] Filed: Dec. 22, 1993

[51] Int. Cl.$^6$ ............................................. C02F 1/461
[52] U.S. Cl. ................................... 204/131; 204/149; 204/290 F; 204/294; 210/748
[58] Field of Search .................... 204/149, 290 F, 294, 204/131; 210/748

[56] References Cited

U.S. PATENT DOCUMENTS

| | | | |
|---|---|---|---|
| 4,014,766 | 3/1977 | Watanabe et al. | 204/152 |
| 4,308,122 | 12/1981 | DasGupta et al. | 204/257 |
| 4,399,020 | 8/1983 | Branchik et al. | 204/269 |
| 4,676,878 | 6/1987 | Chez | 204/101 |
| 4,839,007 | 6/1989 | Kotz et al. | 204/149 |
| 5,086,014 | 2/1992 | Miyata et al. | 437/103 |
| 5,160,417 | 11/1992 | Neale | 204/130 |
| 5,162,886 | 11/1992 | Nishibayashi et al. | 257/421 |
| 5,216,249 | 6/1993 | Jones et al. | 250/370 |

OTHER PUBLICATIONS

Tenne et al., "Efficient Electrochemical Reduction of Nitrate to Ammonia Using Conductive Diamond Film Electrodes" (1993) pp. 409–415.

Gattrell, M. and Kirk, D. W., "The Electrochemical Oxidation Of Aqueous Phenol at a Glossy Carbon Electrode" *Canadian Journal of Chemical Engineering,* vol. 68 (Dec. 1990) pp. 997–1001.

Kotz, R. et al., "Electrochemical Waste Water Treatment Using High Overvoltage Anodes. Par I: Physical and Electrochemical Properties of SnO$_2$ Anodes" *Journal of Applied Electrochemistry,* 21 (1991) pp. 14–20 no month provided.

Okada, K. et al, "Combustion–Flame Deposition of Diamond" *Journal Chem. Vap. Dep.,* 1 (1992) pp. 157–180. October.

Sharma, A. K., et al., "Diamond Nucleation at the Organic Liquid-metal Interface by Laser–Induced Reactive Quenching" *Mat. Lett.,* 17 (1993) pp. 42–48 July.

Ramesham, R., "Selective Growth and Characterization of Doped Polycrystalline Diamond Thin Films" *Thin Solid Films,* 229 (1993) pp. 44–50 no month provided.

VanWindheim, J. A., et al., "Electrical Characterization of Semiconducting Diamond Thin Films and Single Crystals" *J. Elec. Mat.* 22 (4) (1993) pp. 391–398. no month provided.

Klages, C. P., "Chemical Vapor Deposition of Diamond" *Appl. Phys.* A56 (1993) pp. 513–526. no month provided.

Tenne, R. et al., "Efficient Electrochemical Reduction of Nitrate to Ammonia Using Conductive Diamond Film Electrodes" *Journal Electroanal. Chem,* 347 (1993) pp. 409–415 no month provided.

Patel, K., et al. "Photoelectrochemical Investigations on Boron–doped Chemically Vapour-deposited Diamond Electrodes" *Anal. Chem.,* 65 (1993) pp. 345–351. no month provided.

*Primary Examiner*—John Niebling
*Assistant Examiner*—Arun S. Phasge
*Attorney, Agent, or Firm*—John R. Everett

[57] ABSTRACT

A method of treating a solute in a liquid solution in order to render the solution more acceptable for discharge into the environment, comprises electrolyzing the solution with an anode comprising electrically conductive crystalline doped diamond to thereby oxidize the solute.

23 Claims, No Drawings

METHOD OF ELECTROLYSIS EMPLOYING A DOPED DIAMOND ANODE TO OXIDIZE SOLUTES IN WASTEWATER

FIELD OF THE INVENTION

The invention relates to treating solutes in liquid solutions for the purpose of making the solutions more acceptable for discharge into the environment. More particularly, the invention concerns oxidizing the solutes by electrolyzing the solutions with certain types of anodes that provide various advantages.

BACKGROUND

Many industrial waste streams possess characteristics which restrict or preclude their discharge to municipal treatment facilities. Contaminants in wastewater may be organic or inorganic in nature and often are found in combination with one another. Some of the parameters which are regulated are the solution's chemical oxygen demand (COD), total organic carbon (TOC) and dissolved organic carbon (DOC). There are also many specific compounds and classes of compounds which are regulated. Examples of these are toxic ions such as cyanide and classes of toxic organic materials such as phenols. Electrochemical oxidation is a convenient technique for reducing the amount of undesirable organic compounds and other oxidizable species in a given solution to a level which is acceptable for discharge to a treatment facility.

Environmental regulations are becoming stricter around the world. Some effluents which were once sewerable must now be collected and hauled away for disposal, putting additional economic stress on manufacturers. It is therefore desirable to have a simple and efficient way of treating effluents in a way which will enable them to be discharged directly to the sewer.

The electrolytic treatment of wastewaters has been the subject of many patents, journal articles and technical presentations over the last few years. See, for example, U.S. Pat. Nos. 4,014,766; 4,399,020; 4,308,122; 4,839,007; and 5,160,417 and Gattrell, M. and Kirk, D. W., "The Electrochemical Oxidation of Aqueous Phenol at a Glassy Carbon Electrode" *Can. J. of Chem. Eng.*, vol. 68 (Dec. 1990) pp. 997–1001. The advantages of electrolytic oxidation of wastes over chemical or thermal processes are the ease of operation, simplicity of design and relatively small equipment space requirements. Electrolysis is also considered to be relatively safe to operate when compared to oxidative treatment techniques which necessitate handling powerful chemical oxidants.

However, there are a number of problems and drawbacks associated with many known methods of electrolytic oxidation of solutes in wastewaters. Such problems and drawbacks appear to result in part from the particular materials which constitute the anodes employed in such electrolytic methods.

Most anode materials gradually corrode during use in electrolytic oxidation, especially in harsh chemical environments. Corrosion of typical anodes such as platinum, ruthenium dioxide, lead dioxide and tin dioxide leads to discharge of toxic materials into the environment. Secondly, non-renewable metal resources are consumed. Platinum anodes are the most acceptable of the traditional electrodes. In practice, the rate of loss of platinum from the electrode is high enough that a metal recovery system such as ion exchange would be required to remove the platinum from solution both for regulatory and economic reasons. The higher overall cost of such a system combined with the added level of complexity would severely limit the usefulness of the electrolytic oxidation treatment technique.

Tin dioxide on a conductive substrate shows promise as an anode; however, passivation of this electrode occurring at the tin/substrate interface has been cited as a mode of failure. See, for example, Koetz et al., *Journal of Applied Electrochemistry*, 21 (1991) pp. 14–20.

Also, many known anode materials (e.g., platinum) tend to become fouled during electrolytic oxidation of various solutes (e.g., phenols) by the formation of an adsorbed layer of residue on the working surface of the anode, which lowers the effectiveness and shortens the useful life of the anode, resulting in lengthier treatment time, more down time, and higher overall expense for electrolytic methods.

Furthermore, most known anode materials exhibit lower-than-desirable energy efficiency when employed in electrolytic oxidation, requiring relatively lengthy time and relatively high amounts of energy expenditure to achieve desired results at electrical current densities typically employed.

Also, when attempts are made to increase the rate of electrolytic oxidation by raising the current density at the working surface of many typical anodes, there is often a corresponding decrease in energy efficiency of the anodes, which at least partially offsets the effort to improve oxidation rate by raising current density and increases the amount of energy expenditure required.

Another drawback of prior art electrolytic oxidative methods, in regard to attempts to treat a wide range of different solutes that may be found in industrial wastewaters, is that anodes commonly employed in such attempts, e.g., platinum anodes, have been found by the present inventors to be so energy inefficient in treating some solutes, that they can be considered virtually ineffective at oxidizing such solutes, e.g., chelating ligands such as phosphonates or hydroxycarboxylic acids that are often included in various photographic solutions.

Also, while some electrolytic methods employing typical anodes have some effect on certain types of solutes, it is not the desired effect. For example, attempts to employ typical platinum anodes to electrolytically treat solutions containing mixtures of dissolved phenols and halide ions have been found by the present inventors not to result in the complete oxidation of the phenols. Rather, undesirable side reactions occur that cause the formation of halogenated hydrocarbons that precipitate out of the solution and then must be dealt with by some other means in addition to the attempted electrolytic oxidation.

Therefore, there is a continuing need for a method of electrolytic oxidation of solutes in liquid solutions that will avoid or minimize the problems and drawbacks described above. That is, a method is needed wherein: the anode employed does not itself discharge toxic or non-renewable metal resource materials into the solutions; the anode does not tend to become fouled and lower its effectiveness and useful life; the anode enables the method to be carried out with relatively high energy efficiency, both at electrical current densities typically employed heretofore and at current densities significantly higher than those typically employed; and the anode enables the method to be effectively applied to a wide range of different solutes in an energy-efficient manner and without causing extensive undesirable side reactions that would prevent the complete oxidation of the solutes.

SUMMARY OF THE INVENTION

The present invention meets the above-noted need by providing a method of treating a solute in a liquid solution in order to render the solution more acceptable for discharge into the environment, comprising electrolyzing the solution with an anode comprising electrically conductive crystalline doped diamond to thereby oxidize the solute.

As used herein, the term "electrically conductive" is intended to mean having less than 1M Ω cm electrical resistivity.

It has been unexpectedly and unpredictably found that the use of an electrically conductive crystalline doped diamond anode in the method of the invention provides a number of advantages. The anode does not tend to become fouled during use in the method. The anode enables the method to be carried out with relatively high energy efficiency, both at electrical current densities typically employed heretofore and at current densities significantly higher than those typically employed. The anode enables the method to be effectively applied to a wide range of different solutes in an energy-efficient manner and without causing extensive undesirable side reactions.

In addition, the diamond anode does not discharge toxic or non-renewable metal resource materials into solutions treated by the present method.

DESCRIPTION OF PREFERRED EMBODIMENTS

The only essential difference of the method of the present invention from previously known methods of electrolytically oxidizing solutes in liquid solutions to render the solutions more acceptable for discharge into the environment, lies in the nature of the anode employed in the method. In virtually all other respects the method can be the same or similar to previously known methods., A partial list of features and parameters that the method of the invention can have in common with known prior art methods includes, for example: overall electrolytic cell designs, except for the anode; counter-electrodes, i.e., cathodes; power sources and connections thereto; voltage and/or current control devices; solution agitation and pumping devices; solution flow rates; and process temperatures.

While the anode employed in the inventive method can comprise solely a self-supporting layer or film of the electrically conductive crystalline doped diamond directly connected to a power source (prepared, for example by deposition of the diamond on a removable substrate followed by separation of the diamond from the substrate), it is preferable that the anode comprise a layer or film of the doped diamond on an electrically conductive substrate with electrical connection of the substrate to a power source.

Preparation of the Diamond Anode

Chemical vapor deposition (CVD) of diamond films can be accomplished in a number of different known ways with varying levels of sophistication. At atmospheric conditions, diamond can be deposited from a conventional oxygen-acetylene torch. This technique is simple and allows for the coverage of relatively large surface areas with high deposition rates and good control over the film's morphology. See, for example, Okada et al., *J. Chem. Vap. Dep.* 1 (1992) 157-180. Recently, diamond has been synthesized from cyclohexane and decalin by laser induced reactive quenching of these liquid precursors on a tungsten substrate. See Sharma et al., *Mat. Lett.* 17 (1993) 42-48.

Since diamond electrodes useful in our inventive method require doping to impart sufficient electrical conductivity to them, we prefer to make use of plasma enhanced CVD (PECVD) diamond deposition techniques. See, for example, Ramesham, *Thin Solid Films* 229 (1993) 44-50. The electrical characterization of such films is well established because of their use in microelectronic applications. See, for example, J. A. von Windheim et al., *J. Elec. Mat.* 22(4) (1993) 391-398. PECVD diamond films that we have employed as electrodes in some embodiments of the inventive method are boron doped polycrystalline diamond prepared from a mixture of methane and hydrogen gases subjected to activation by a microwave plasma. The deposition of diamond films by this technique is well understood by those skilled in the art. See, for example, Klages, *Appl. Phys.* A56 (1993) 513-526.

Primarily due to reasons of commercial availability, a preferred mode of diamond film deposition is the known hot filament CVD (HFCVD) technique. See, for example, Klages, *Appl. Phys.* A56 (1993) 513-526. Diamond films prepared in this manner that we have used as electrodes in some embodiments of the inventive method are commercially available from Advanced Technology Materials, Inc., 7 Commerce Drive, Danbury, Conn. 06810.

Anode Characteristics Morphology

The morphology of synthetic diamond films has been shown to vary widely and is influenced by many factors, including the technique used for the deposition, the conditions of the deposition, and the type of substrate on which the film is grown, just to mention a few. Broadly, a film characterized by either X-ray Diffraction, Raman Spectroscopy, Electron Energy Loss Spectroscopy or other analytical techniques amenable to the characterization of diamond and shown to be predominantly diamond in nature but containing dopant material to provide sufficient conductivity are expected to function in the capacity outlined for this invention. Conductive diamond films of many morphological varieties will have some utility for electrooxidative treatment of solutes. Preferable useful films are polycrystalline in morphology with crystallite sizes from the submicron range to large single crystals. Properties and factors controlling effective electrochemical application are described below.

Diamond Film Characteristics

One of the most important aspects of a useful diamond electrode material is electrical conductivity. Without sufficient conductivity the potentials necessary to drive an electrochemical cell will be excessive and at some point operation of the electrochemical cell is entirely economically unfeasible due to severe power consumption and other technical difficulties associated with electrodes with high resistivities.

Undoped diamond is a large band gap (5.5 eV), transparent, insulating material in the absence of any dopant impurities. It is known that by incorporating dopant impurities such as boron in appropriate levels, one can control the conductivity of synthetic diamond particles and films. See, for example, U.S. Pat. No. 5,216,249, the disclosure of which is hereby incorporated herein by reference. The type of dopant used to impart conductivity to the diamond is not limited to boron and can alternatively comprise a number of other elements, including, for example, lithium, beryllium, nitrogen, phosphorus, sulfur, chlorine, arsenic, and selenium, as described, e.g., in U.S. Pat. No. 5,162,886, the disclosure of which is hereby incorporated herein by reference. Nevertheless, boron is a well known and commonly used dopant for creating a more conductive form of diamond (see, for example, U.S. Pat. No. 5,086,014, the disclosure of which is hereby incorporated herein by reference) and resistivities lower than 20 m $\Omega$ cm can be achieved. A general useful range of the boron/carbon weight ratio in the doped diamond is from ca. 0.02 to ca. $10^{-6}$.

The total resistance of the electrode assembly depends, not only on the conductivity of the components (electrical contacts, substrate, interphase between the substrate and diamond film, and diamond film), but also on the thickness of each of the components. As a result, the portion of the electrode resistance associated with the diamond film can be controlled by changes in the conductivity of the diamond as well as the diamond film thickness. To achieve a given resistance aim, a number of compositions of the diamond film can be formulated. Since resistance will increase proportionally with film thickness and inversely with conductivity, one can devise a family of films which will yield similar resistance and provide the desired properties for effective use in applications for electrodestruction. The preferred formulation involves films of thickness in a range of 3 $\mu$m to 1 mm, and the most preferred formulation will have films of thickness in a range of 10 to 100 $\mu$m, with resistivities which conform to the power requirements outlined in the section below on "Power Considerations." If the film becomes too thin it may not adequately cover the surface of the substrate and the effective surface area of the electrode may be significantly reduced. In contrast, if the film becomes too thick, the resistivity of the film will cause a potential drop across the thickness of the electrode and energy will be lost due to resistive heating of the electrode. In the extreme, a thick film with significant resistance may heat during use and compromise the bond between the film and the substrate resulting in the delamination of the film from the substrate.

Substrate Characteristics

The function of the substrate is to provide a facile pathway for the flow of current through the electrode assembly and mechanical support for the thin diamond film. Many different conductive substrates can be employed in the formulation of an electrode assembly that is useful for electrochemical transformations. However, three attributes of the substrate are of most importance. First, substrate electrical conductivity is essential in the construction of a useful electrode, and many of the same factors described above for diamond films apply to the choice of a substrate material. Evaluation of the resistivity of the substrate material and the appropriate thickness will allow one to achieve the proper resistance for applications in various electrochemical systems. For example, a resistance across the thickness of the substrate in the range of 10,000 to 1000 ohms will have some use in low current applications if the resistance across the entire electrode assembly is also between 10,000 and 1000 ohms. However, such high resistance across the electrode assembly is undesirable and a more preferred range for resistance of the electrode assembly is between 1000 and 10 ohms. Particularly preferred values for the resistance of the electrode assembly will be less than 10 ohms and most preferably less than 1 ohm. The optimum scenario of thickness and resistivity of the substrate will depend on the mechanical strength of the substrate material, but thickness will be in the range of 0.5 mm to 10 cm where the resistivity of the substrate is in the range of less than 20 $\Omega$ cm to less than 0.1 $\Omega$ cm.

The second and third attributes of the substrate are closely related and involve the formation of an interphase as a result of the process of depositing the doped diamond on the substrate. One recent report examined the interphase between a hot filament deposited diamond thin film and a silicon substrate by using the technique of high resolution electron microscopy and is illustrative of the complexity of such an interphase (Jiang, N. et al., *Appl. Phys. Lett.* 1993, 63(3), 328). Suggestions that an amorphous carbon layer or a crystalline SiC layer were necessary for nucleation of diamond were unproven until the work by Jiang et al. showed clearly that both are present in the interphase between diamond and silicon. For electrochemical applications, the interphase should promote adhesion of the diamond film to the substrate and allow good electrical contact between the substrate and the diamond film. The interphase is generally a material distinct from the substrate and the film and allows good adhesion between substrate and film. In addition, the interphase should be conductive or so thin that good electrical contact is achieved and no appreciable resistance results from its formation. Metals which form conductive stable carbides are widely accepted as good substrate materials for the deposition of diamond. The interphase is generally accepted to be a carbide that conforms to the adhesion and electrical contact guidelines stated above. For example Mo, W, Ti, Cu, Co, Cr, Ni, and suboxides of Ti (described, e.g., in U.S. Pat. No. 4,912,286) are a few examples, but substrates useful in the present invention are not limited to only those metals. In fact, a commonly used substrate is p-type, degenerately doped Si. Such a Si substrate has a resistivity on the order of 0.1 to 0.01 $\Omega$ cm and is not the most desirable substrate material. The more preferred substrate will have good adhesion to diamond through a stable conductive interphase, high conductivity and in the optimum case will either be non-electrochemically active or will form a passivating film that will protect any part of the substrate that comes in contact with the treated solution. Examples of such materials are Ti, Ta, Zr, or Nb. A metal such as Ti is ideal since contact with the electrolyte solution will not significantly corrode the metal substrate and will alleviate any concerns about substrate failure resulting from contact of the electrolyte with the substrate in an electrochemical treatment.

Electrical Contact to the Diamond Electrode Assembly

For the present invention, good electrical connection of the power source to the substrate is necessary to obtain proper control over the flow of current through the electrode assembly. Broadly, any means is desirable that will facilitate electrical contact to the back of the conductive substrate and will serve to allow current to pass through the substrate and the diamond film from some current or potential controlling unit such as a potentiostat, battery or other form of electrical power.

The preferred form of the contact may be either through a conductive epoxy such as silver epoxy, which allows one to fasten a wire or other current carrying material to the substrate or through direct physical contact to the current carrying material made by exerting pressure between the electrode assembly and the current carrying material. Ideally, a one piece assembly in which the substrate acts as a current carrier by contact to the power source and adhesion to the diamond film would provide the most robust and useful form of the electrode assembly, especially if any exposed material is impervious to the effects of corrosion by an electrolyte solution.

Power Considerations

The power consumption can be calculated with a simple equation involving Resistance (R) and current (I) as shown below:

$$\text{Power} = (I)(R)^2 \quad (\text{eq 1})$$

Equation 1 clearly indicates that power consumption increases with the square of the resistance and is directly related to the current passed. The potential drop across a diamond film electrode will depend on the resistivity and the thickness of the diamond film as well as the resistivity and thickness of the substrate and any resistance in the connection to the electrode. In the following discussion the conductivity of the substrate and nature of the contact are assumed to make a negligible contribution to the overall potential drop across the electrode assembly.

As the potential drop across the electrode increases to a value in the range of 10 to 100 V at a current density of 10 mA/cm$^2$, the power consumption becomes quite large and significant energy is lost to resistive heating. In principle, diamond films with resistivities lower than 1M $\Omega$ cm offer some utility as electrodes for electrochemical treatment of solutes as long as the substrate on which the film exists has sufficiently high conductivity and the film thickness is low (less than 5 $\mu$m).

A more preferred form of the electrode involves the use of a diamond film with a resistivity less than 100 $\Omega$ cm and a thickness which will give a potential drop across the electrode of less than 1 V at a current density of 100 mA/cm$^2$. Such an electrode will function at moderate current densities with little power loss resulting from resistive heating.

The most preferred form of the electrode will have a resistivity of less than 0.1 $\Omega$ cm and will have a thickness which will give a potential drop across the electrode of less than 0.1 V at a current density of 1A/cm$^2$.

Electrochemical Cell Configuration

The electrode assemblies described as useful in the present invention can be used in various electrochemical cells and in a number of modes. In broad terms, the basic elements employed to accomplish the desired electrochemical reactions are a diamond anode as described above and a cathode, which may be constructed from any number of materials commonly used as counter electrodes, including but not limited to stainless steel, various allotropes of carbon, noble metals such as Pt or Au, Ni, Ta, and Ti or suboxides of titanium. Also necessary are the connections to a power source which allows the control of electrode potential or current or both, and a power source which supplies the potential or current necessary to achieve the desired electrochemical reaction. Another component which is useful but not necessary is a means to flow a solution past the anode and cathode so as to maintain a certain concentration of the target solute or its breakdown products which are to undergo electrochemical reactions. Such an apparatus could be a pump of any number of configurations that allows the desired flow of solute to the electrodes and facilitates the desired reaction at an optimum rate.

Broadly, the present invention may be used in a number of configurations. The electrochemical cell may be operated as a single compartment cell or as a divided cell in which the anode and cathode are separated by a membrane. The simplest embodiment is a single compartment cell. For example, consider the electroincineration of an organic compound composed of carbon, hydrogen, and oxygen. With a single compartment cell there is no barrier separating the anode and cathode, and solutes are not restricted from moving between the anode and cathode. Such a single compartment system has one major drawback. Solutes oxidized at the anode in a desired electrodestruction reaction may be subsequently reduced at the cathode to reverse the reaction. A reversible oxidation/reduction reaction that results in the recycling of a component or components in a mixture is undesirable. Such cycling yields a parasitic current that retards progress toward the goal of a net oxidation of solute to inert and fully oxidized products. Nevertheless, most electrooxidative decomposition reactions involve the breaking of C-H and C-C bonds and the formation of C-O and O-H bonds with the net result of increasing the amount of oxygen in the products. Large molecular rearrangements which accompany oxidation or reduction reactions are not facile and often require large overpotentials. Such oxidation reactions are not generally reversible by a simple reduction at the cathode. So, while some parasitic current might be expected, the nature of electrodestruction reactions implies that such reversible reactions will not contribute significantly to inefficiencies. Another factor that aids in preventing large parasitic currents due to recycling of solute oxidation products is the depolarizing effect of aqueous solutions at reducing potentials. Water acts as a depolarizer and prevents the cathode from reaching extremely low potentials where some oxidation products would be reduced at a more significant rate.

In a two compartment cell, a separator is inserted between the anode and cathode which allows only certain types of ionic species to pass from the anolyte to the catholyte or vice versa. The function of the membrane is to maintain electroneutrality without allowing bulk mixing of the anolyte and catholyte solutions. The advantage of the two compartment cell results from the ability to spatially control the solutes which are contained in the anolyte and catholyte. The two compartment cell with the proper choice of membrane prevents recycling reactions from occurring, thereby limiting the amount of parasitic current. In addition, a two compartment cell allows additional process control. For example, a depolarizer other than water may be introduced into the catholyte without the problem of oxidation of the depolarizer in the anode compartment. Also with the proper membrane one can control the nature of the ions which are transported across the membrane. Suppose that there was a metal cation in the anolyte solution, and precipitation onto the cathode was not desired. With an anion exchange membrane one could limit the exchange of the metal cation through the membrane and prevent the plating reaction which otherwise would occur in a single compartment cell.

However, the two compartment cell also has certain drawbacks. The main drawback concerns the limitations imposed by the membranes used. Membrane durability is a major concern. The primary mode of membrane failure is due to fouling. During electrodestruction a variety of organic compounds are formed including polymeric materials. The products are often less soluble than their precursors and often deposit onto the membrane surface. The build-up of organic material on the membrane surface tends to block pores that allow the flow of ions through the membrane, and an increase in resistance occurs. Prolonged use of a fouled membrane eventually results in catastrophic failure and the membrane ceases to function properly. So, while the membrane serves to reduce the parasitic current, new complications arise as a result of fouling.

Given the above scenarios for the use of single compartment cell and two compartment cell configurations, the preferred use on the basis of simplicity is the single compartment cell. However, the more preferred mode may be the two compartment cell, if there is more concern that parasitic currents due to recycling of the solute should be reduced to a minimum and that better control over the process should be available, in any given situation.

In addition to the basic configuration of the cell, other factors will determine the mode in which the cell is used. The cell may be configured such that the solution passes the electrode only one time and would be set up so that the desired degree of degradation occurs in the time that the solute passes the electrode. Another configuration may be to have a partially recirculating system in which some portion of the treated solution would be recirculated through the cell and the other portion removed to some other zone. The preferred mode will depend directly on the objective of the electroysis. For complete degradation of the solute, a batch system or recirculation mode is most beneficial, because more than one pass of the solute through the cell increases the likelihood that the solute will be degraded more completely and by flowing the treated solution, the depletion zone near the electrodes (i.e., the region in which the concentration of the solute is significantly less than the bulk concentration) will be minimized, so that the maximum efficiency can be maintained throughout the electrolysis. With each pass additional oxidation reactions will occur and the solute and the products of degradation will be oxidized further. If the electrode is large enough and sufficient time is available, a suitable net removal of the solute can be accomplished.

Current Density Considerations

The practical application of electrochemical incineration to the destruction of undesirable chemicals in any solution requires a number of essential features. For example, one absolutely essential component is an electrode which is effective in oxidizing or reducing and thus removing the undesirable chemical from the solution. Without the fundamental property of electrode activity for electrochemical oxidation or reduction (depending on the reaction) the process of electrodestruction will not be possible. In addition to activity, the electrode must retain some significant portion of activity at current densities which allow for the destruction of a solute in some finite amount of time. Since the rate at which a chemical is removed from a solution is directly related to the amount of current passed over some period of time and to the size of the electrode, the current density will often determine the rate at which the desired reaction will occur. Current density is related to current by the following simple equation:

$$\text{Current Density} = \text{Current}/\text{Electrode Area} \quad (\text{eq 2})$$

To be practical, the technique of electrochemical incineration must have the capability of destroying solutes at a rate greater than or equal to the rate at which the solute is produced. The actual practical rate will be determined separately for each process and a batch, in-line, or combination treatment can be designed. Since some processes are not continuous, the rate of treatment can be determined by the time-average rate at which the solute is produced.

As one can see from Equation 2, with respect to current density, there are essentially two control parameters that are used to address the problem of treating a solute on the timescale over which it is produced. Other parameters such as temperature, flow rate and kinetics of the reaction of interest will influence the rate at which the solute can be treated. Adjustment of flow rate and temperature provide some control over the reaction rates, and the kinetics of the reaction are fixed at a given electrode surface and solution matrix and are difficult to influence in general. However, for current density, the applied current or potential and the electrode area are the most important considerations. The simplest parameter to control is the applied current or potential. By increasing the applied current or the applied potential, one can directly influence the rate at which a solute is destroyed and thus achieve a destruction rate that will adequately address the system under consideration. However, the current parameter has some practical drawbacks and limitations. One limitation is related to the variation of energy efficiency as a function of current density. For purposes of comparison, energy efficiency is broadly defined here as the number of coulombs necessary to achieve a given change in a given amount of a solute in a solution. Even under the best conditions there exists a practical limit for the rate at which a solute can be destroyed and a corresponding limit to the increase in such a rate with increased current density. The practical limit depends on several parameters, but the most important factors are the rate at which the solute is delivered to the electrode (mass transfer) and the maximum rate at which the solute can be destroyed at the electrode surface (kinetic limit). Mass transfer can be adjusted by controlling, for example, the flow rate in an electrochemical flow cell. However, if the reaction rate at the electrode surface is slow compared to the mass transfer limit, the reaction is termed "kinetically controlled" and will not be significantly influenced by increasing the mass transfer rate. For many electrodestruction reactions, chemical bonds are broken and large molecular rearrangements occur. Such transformations are often much slower than simple single-electron-transfer reactions. In many of our studies with diamond film electrodes, changes in flow rate (to change mass transfer) do not significantly effect the rate at which the solute is destroyed. The destruction efficiency nondependence on flow rate indicates that for those reactions, we are operating under "kinetically controlled" conditions in the electrolytic destruction. As a result, the rate at which various destruction reactions occur is strongly influenced by the current density and electrode potential. On the other hand, for some reactions mass transfer will be the limiting step, and the increase in rate of destruction with increasing current density will fall off significantly after a critical current density is reached.

The second parameter one can control is the electrode surface area. Variation in deposition technique and parameters allow some control of the crystallite size and therefore the roughness of the diamond film electrode. While the measurement of electrode area seems straightforward, the surface properties of the electrode may yield misleading results if it is presumed that macroscopically measured surface area can be equated to the actual electrode surface area. If the electrode is perfectly flat, the macroscopic measured geometrical area will yield an unambiguous value for the electrode surface area, and the current density will be uniform across the bulk of the electrode surface. However, if the surface of the electrode is not smooth and significant roughness is present in the surface, the measured macroscopic geometrical area will yield an underestimation of the true electrode surface area, and the calculated current density will be overestimated. Since a rough electrode surface will yield a non-uniform current density across the electrode, the situation is in fact more complicated. A rough electrode will have peaks and valleys in the surface and the current density will be highest around the peak areas and lowest in the valleys. Sharp terminating surface points will experience the highest current densities. As a result certain features on the electrode surface will operate under current densities higher than the calculated current density, and some areas will operate at current densities lower than the calculated value.

Since a high surface area electrode offers more electrode surface on which reactions can occur, it is advantageous to have a rough electrode surface. Polycrystalline diamond films are by their nature rough surfaces, and as a result provide excellent surface area properties for use in electrochemical systems.

In addition to the electrode surface area, one must also consider variations in current density resulting from the electrochemical cell design. Since current flows between the anode and cathode, the positioning of the electrodes is important in obtaining the most uniform current density distribution. While a diamond film electrode-containing electrochemical cell will function with the cathode in any number of skewed positions, the preferred arrangement is with the cathode surface parallel to the plane of the diamond film. In addition, for the best mode of operation, the interelectrode gap is kept as small as possible without creating a pathway for direct connection or shorting of the anode and cathode. Broadly, large interelectrode distances of greater than several centimeters are acceptable. A more preferred interelectrode gap is in the range of 10 mm to 0.1 mm and the most preferred condition is where the interelectrode gap is in a range of 0.1 mm to 5 mm.

With the kinetic, current density, and electrode area discussion in mind, the present invention will be useful under conditions where the current density is in a range of approximately 10 A/cm$^2$ to 1 mA/cm$^2$, the flow rate/cell volume ratio is approximately 0.001 to 100, and the electrode surface area is equal to or greater than the macroscopic measured geometric surface area of the electrode. However, more preferred conditions would include current densities in the range of 1 A/cm$^2$ to 20 mA/cm$^2$ with flow rate/cell volume ratios of from 10 to 0.01 and electrode surface area greater than the macroscopic measured geometrical electrode area. The best mode of operation of the invention is with current densities in a range of 50 mA/cm$^2$ to 600 mA/cm$^2$, flow rate/cell volume ratios in a range of 10 to 1, and electrode surface areas well in excess of (at least two times) the macroscopic measured geometrical area of the electrode.

Solutions and Solutes

The present inventive method is advantageously applicable to any solution containing solutes susceptible to electrolytic oxidation to improve the solution's acceptability for discharge into the environment. Many different industrial waste solutions (e.g., from the paper pulp industry, dye manufacturing, photofinishing, etc.) can benefit from treatment by the inventive method. Many or most of these are aqueous solutions.

Many different solutes, both organic and inorganic, in such solutions are susceptible to advantageous treatment by the inventive method. Some types of compounds, among many that can particularly benefit from treatment by the inventive method include, for example; phenols; hydroquinones; glycols; phenylenediamines; phenidones; amino alcohols; cyanides; hydroxymethylbenzenes; carboxylic acids; chelating agents, such as phosphonates, aminocarboxylic acids, and hydroxycarboxylic acids; aldehyde-releasing agents, such as hexamethylene tetraamine and glutaraldehyde bisbisulfite; and mixtures of any thereof.

A particular industry that can especially benefit from use of the inventive method is photofinishing. Numerous different solutions used in processing silver halide photographic elements can be advantageously treated by the inventive method, for example, developer, fixer, bleach, bleach-fix, stabilizer, and washwater solutions, and mixtures of any thereof. Such photoprocessing solutions contain a broad range of chemicals with concentrations ranging from 1 ppm up to several thousand ppm. Many of these constituents are susceptible to electrochemical oxidation. The inventive method exhibits a high efficiency towards the oxidation of a wide variety of both organic and inorganic solutes present in these solutions.

For simplicity of design and operation it is preferred to perform electrolyses of photoprocessing solutions without adding any chemicals to the process. Photoprocessing solutions typically have an ionic strength sufficient to perform electrolyses without introducing a supporting electrolyte. In other types of solutions this may or may not be so, and it may be desirable or necessary to add an additional electrolyte to make the solution being treated electrically conductive. Preferably, the electrolyte is strong (i.e., ionizes substantially completely upon dissolution). Non-limiting examples of strong electrolytes include $HNO_3$, $HClO_4$, $H_2SO_4$, HCl, HI, HBr, $HClO_3$, $HBrO_3$, alkali hydroxides, alkaline earth hydroxides (e.g., calcium hydroxide) and most salts (e.g., calcium chloride and sodium chloride). More preferably, the electrolyte is selected from sodium hydroxide, sodium sulphate, calcium chloride, sodium chloride, calcium hydroxide and mixtures thereof. The electrolyte may be added in any suitable form. For example, if the electrolyte is a solid, it may be dissolved in the solution to be treated prior to entry into or while actually in the electrolytic cell. Alternatively, the electrolyte may be dissolved and stored as a solution in a separate vessel. The electrolyte solution would then be added, as required, to the electrolytic cell. If the electrolyte is in the form of a liquid, it may be added, as required, to the electrolytic cell either neat or in the form of a dilute solution.

The optimum mode of electrolyzing photoprocessing solutions is one in which the treated effluent can be directly discharged to the environment. To accomplish this it may be necessary to adjust the pH into a range which meets sewer codes. Since developers typically exhibit a pH above 10.5 this would mean the introduction of an acid to lower the pH to an acceptable value for discharge. Adjustment of pH could be made after electrolysis or during electrolysis depending on the desired outcome. In certain cases the optimum mode of operation may be to combine effluents from a number of different processes and perform the electrolysis on the mixed effluent.

Examples of some particular photoprocessing solutions that have been advantageously treated by the inventive method are seasoned (i.e., having undergone some use in photoprocessing) solutions commercially obtainable from Eastman Kodak Company, USA, and known in the trade as KODAK ™ Process: E6 first developer; E6 color developer; RA4 color developer; RA100 color developer; C41 color developer; RP X-OMAT developer; R3 first developer; R3 color developer; 61FN fixer; C41 bleach; washwater from the wash step following the bleach step of C41 process; washwater from the wash step following the fixer step of C41 process; and washwater from the wash step following the fixer step of a black-and-white graphics development process.

The following examples are presented to further illustrate some specific embodiments of the method of the invention. In some cases comparative examples are provided to illustrate advantages of the inventive methods over methods outside the scope of the invention.

Electrochemical Flow Cell

Unless otherwise indicated, where it is stated in an example that an electrochemical flow cell was employed, the cell was a commercially available single compartment electrochemical flow cell (ElectroCell AB Micro Flow Cell, Box 7007, S-183 07, Taby Sweden, commercially distributed by Electrosynthesis Co., Inc., Lancaster, N.Y.) fitted with a polyvinyl chloride (PVC) holder for the diamond electrode. A boron-doped polycrystalline diamond film having a thickness of about 2-5 $\mu$m deposited on a degenerately boron-doped, (100) single crystal silicon wafer of 0.76 mm thickness was used as the anode. It was commercially obtained from Advanced Technology Materials, Inc., 7 Commerce Drive, Danbury, Conn. 06810. The resistivity of the diamond film was less than 100 m $\Omega$ cm with a boron concentration in the range of 1000 to 10,000 ppm. The resistivity of the silicon wafer was less than 20 m $\Omega$ cm. The diamond films were deposited on silicon by hot filament chemical vapor deposition at approximately 800° C. Electrical contact to a high current potentiostat equipped with a coulometer was made through the backside of the electrode assembly by fixing a multistrand copper wire to the silicon substrate using a commercially available silver epoxy (Epo-Tek H20E, Epoxy Technology Inc.). Leakage of solution to the backside of the electrode was minimized using RTV silicone to seal the critical surfaces between the diamond electrode and the PVC holder. The anode, having an apparent surface area of about 3 cm$^2$, was fixed in a parallel plate fashion with a stainless steel cathode of 12 cm$^2$. A nylon screen turbulence promoter was placed between the anode and cathode, resulting in an interelectrode gap of about 5 mm. The same type of cell was employed in comparative examples, except that the anode comprised a platinum layer, having 12 cm$^2$ apparent working surface area on a titanium substrate. The anode is commercially available from Electrosynthesis Co., Inc., Lancaster, N.Y.

Electrochemical Beaker Cell

Where it is stated in an example that an electrochemical beaker cell was employed, the cell comprised a standard 50 mL Pyrex beaker. A #9 rubber stopper was inserted into the top of the beaker through which holes were bored to accommodate the electrodes. The anode was a boron-doped, polycrystalline diamond film having a thickness of about 2-5 $\Omega$ m deposited on a degenerately boron-doped (100) single crystal silicon wafer. The apparent surface area of the diamond face was about 0.5 cm$^2$. The resistivity of the diamond film was less than 100 m $\Omega$ cm with a boron concentration in the range of 1000 to 10,000 ppm. The resistivity of the silicon wafer was less than 20 m $\Omega$ cm. The diamond film was deposited on the silicon by the microwave plasma enhanced chemical vapor deposition technique. Electrical contact to the electrode assembly was made by attaching a copper alligator clip to one end of the electrode assembly and subsequently protecting the alligator clip from electrochemical or chemical corrosion by covering the clip with a commercially available white epoxy (Dexter Corporation, Epoxi Patch, 1C White). The cathode was a 1 mm diameter stainless steel wire. The interelectrode gap was in the range of 5-10 mm. The examples were run at constant current without a separator. Agitation was provided by means of a magnetic stirrer. The performance of the electrode was determined by measuring the decrease in chemical oxygen demand (COD) and dissolved organic carbon (DOC) as a function of the charge passed.

EXAMPLE 1 AND COMPARATIVE EXAMPLE A
Electrolysis of E6 first developer 30 mL of Kodak ™ process E6 seasoned first developer tank overflow was circulated through the electrochemical flow cell by means of a peristaltic pump at a rate of 200 mL per minute. The mixture was electrolyzed under a constant current of 310 mA. The apparent surface area of the diamond anode was 3.1 cm$^2$ resulting in a current density of 100 mA/cm$^2$. The cell voltage at this current density was about 4.9 V. During a time period of 6.25 hours the total number of coulombs passed was 8,140. The performance of the electrode was determined by measuring the decrease in chemical oxygen demand (COD) and dissolved organic carbon (DOC) as a function of the charge passed. The initial values of COD and DOC were 32,500 and 8,465 ppm, respectively. At the completion of the electrolysis, the COD was reduced by 73% and the DOC was reduced by 56%.

In contrast, when the comparative Pt-on-Ti anode was employed, a significantly greater amount of coulombs yielded significantly lesser amounts of reduction in COD and DOC, thus illustrating the improved energy efficiency of the inventive method at typical current density.

Results are presented in Table I, below.

TABLE I

| Coulombs | Diamond - Ex. 1 ppm COD | Diamond - Ex. 1 ppm DOC | Platinum - Comp. Ex. A ppm COD | Platinum - Comp. Ex. A ppm DOC |
|---|---|---|---|---|
| 0 | 32,500 | 8,465 | 32,500 | 8,465 |
| 3,100 | 20,150 | 6,685 | | |
| 8,140 | 9,038 | 3,770 | | |
| 9,730 | | | 14,200 | 5,470 |
| 25,960 | | | 7,525 | 3,432 |

Example 2 and Comparative Example B Electrolysis of E6 color developer 30 mL of Kodak TM process E6 seasoned color developer tank overflow was circulated through the electrochemical flow cell by means of a peristaltic pump at a rate of 200 mL per minute. The mixture was electrolyzed under a constant current of 310 mA. The apparent surface area of the diamond anode was 3.1 $cm^2$ resulting in a current density of 100 $mA/cm^2$. The cell voltage at this current density was about 5.0 V. During a time period of 4.75 hours, a total of 5,800 coulombs were passed through the solution. The performance of the electrode was determined by measuring the decrease in chemical oxygen demand (COD) and dissolved organic carbon (DOC) as a function of the charge passed. The initial values of COD and DOC were 19,050 and 4,541 ppm, respectively, and were reduced by 80% and 70%, respectively, during the electrolysis.

In contrast, when the comparative Pt-on-Ti anode was employed, a significantly greater amount of coulombs yielded significantly lesser amounts of reduction in COD and DOC, thus illustrating the improved energy efficiency of the inventive method at typical current density.

Results are presented in Table II, below.

TABLE II

| Coulombs | Diamond - Ex. 1 ppm COD | Diamond - Ex. 1 ppm DOC | Platinum - Comp. Ex. B ppm COD | Platinum - Comp. Ex. B ppm DOC |
|---|---|---|---|---|
| 0 | 19,050 | 4,541 | 19,050 | 4,541 |
| 5,800 | 3,800 | 1,433 | | |
| 18,560 | | | 7,350 | 2,466 |

EXAMPLE 3

Electrolysis of Kodak TM process RA4 seasoned developer tank overflow 10 mL of Kodak TM process RA4 seasoned developer tank overflow was electrolyzed in a beaker cell at a current density of 200 $mA/cm^2$. During a time period of 23 hours, 7,760 coulombs of charge were passed through the solution. The initial values of COD and DOC were 55,550 and 16,915 ppm, respectively. At the completion of the electrolysis, the COD and DOC values were reduced by 99% and 98%, respectively. The solution's appearance was clear and colorless after treatment. Thus, the inventive method is shown to be effective and energy efficient at a higher-than-typical current density.

EXAMPLE 4

Electrolysis of Kodak TM process RA 100 seasoned developer tank overflow 10 mL of Kodak TM process RA4 seasoned developer tank overflow was electrolyzed in a beaker cell at a current density of 200 $mA/cm^2$. During a time period of 23 hours, 7,860 coulombs of charge were passed through the solution. The initial values of COD and DOC were 36,150 and 10,345 ppm, respectively. At the completion of the electrolysis, the COD and DOC values were reduced by 99% and 96%, respectively. The solution's appearance was colorless but slightly hazy after treatment. Thus, the inventive method is shown to be effective and energy efficient at a higher-than-typical current density.

EXAMPLE 5

Electrolysis of Kodak TM process R3 seasoned first developer tank overflow 10 mL of Kodak TM process R3 seasoned first developer tank overflow was electrolyzed in a beaker cell at a current density of 200 $mA/cm^2$. During a time period of 24 hours, 8,080 coulombs of charge were passed through the solution. The initial values of COD and DOC were 32,180 and 10,500 ppm, respectively. At the completion of the electrolysis, the COD and DOC values were reduced by 99% and 96%, respectively. Thus, the inventive method is shown to be effective and energy efficient at a higher-than-typical current density.

EXAMPLE 6

Electrolysis of Kodak TM process RP X-OMAT developer tank overflow 10 mL of Kodak TM process RP X-OMAT developer tank overflow was electrolyzed in a beaker cell at a current density of 800 $mA/cm^2$. During a time period of about 3.5 hours, 10,210 coulombs of charge were passed through the solution. The temperature of the solution was kept below about 60° C. with external water cooling on the beaker cell. The volume of the solution was maintained reasonably constant by adding supporting electrolyte as required to make up for evaporative losses. The initial values of COD and DOC were 86,000 and 22,400 ppm, respectively. At the completion of the electrolysis, the COD and DOC values were reduced by 99% and 98%, respectively. Thus, the inventive method is shown to be effective and energy efficient at a higher-than-typical current density.

EXAMPLE 7

Electrolysis of Kodak TM process 61FN seasoned fixer tank overflow 10 mL of Kodak TM process 61FN seasoned fixer tank overflow was electrolyzed in a beaker cell at a current density of 30 $mA/cm^2$. During a time period of 24 hours, 3,610 coulombs of charge were passed through the solution. The initial values of COD and DOC were 35,560 and 1,900 ppm, respectively. At the completion of the electrolysis, the COD and DOC values were reduced by 94% and 21%, respectively. The relatively low reduction of DOC in the fixer is understood when one considers that most of the charge is spent on oxidizing the fixing agent, thiosulfate ion, before significant reductions in the concentration of carbon species will occur.

EXAMPLES 8–13 AND COMPARATIVE EXAMPLES C-H

Treatment of Photoprocessing Wash Water Solutions

In addition to concentrated photoprocessing solutions, more dilute wash water solutions were also treated using a boron-doped diamond anode. To 100 ml solutions of Kodak ™ Process: C-41 Bleach wash, C-41 Fix wash, and Graphics Fix wash was added sufficient $Na_2SO_4$ solid to give 0.5M sodium sulfate concentration. The solutions were pumped through the electrochemical flow cell at a flow rate of 200 ml/min. A current density of 100 $mA/cm^2$ was chosen. The applied current was 300 mA, and the voltage measured between the anode and cathode was in the range of 5 to 7 volts and usually about 6 volts. A 1 ml sample was taken of the stock solution before any current was applied to the cell and served as a starting point for measurement of DOC. In addition, samples were also taken for the measurement of COD. The current was applied and the progress of the reaction monitored by taking three more samples during the electrolysis at various time intervals and one sample at the conclusion of the experiment to establish the time concentration profile for kinetic analysis.

Identical experiments were conducted using a Pt-Ti anode and in every case the efficiency for removal of DOC and COD was significantly better for the diamond anode in comparison to the Pt-Ti anode. While dilute solutions are often not amenable to treatment by electrolysis, the increased efficiency of the diamond anode makes the treatment of dilute solutions more acceptable.

Results are presented in Table III, below.

TABLE III

| Example | Solution | Anode | Current Density ($mA/cm^2$) | Time (secs) | Coulombs | DOC (ppm) | COD (ppm) | Pt (ng/nil) |
|---|---|---|---|---|---|---|---|---|
| 8 | C-41 FixerWash | Diamond | 100 | 0 | 0 | 9.7 | 190 | |
| 8 | C-41 FixerWash | Diamond | 100 | 4800 | 1440 | 10 | 145 | |
| 8 | C-41 FixerWash | Diamond | 100 | 7200 | 2160 | 9.9 | 130 | |
| 8 | C-41 FixerWash | Diamond | 100 | 10800 | 3240 | 10.7 | 110 | 1 |
| 9 | C-41 FixerWash | Diamond | 100 | 0 | 0 | 14 | 240 | |
| 9 | C-41 FixerWash | Diamond | 100 | 3600 | 1080 | 10.4 | 102 | |
| 9 | C-41 FixerWash | Diamond | 100 | 7200 | 2970 | 8.8 | 47 | |
| 9 | C-41 FixerWash | Diamond | 100 | 10800 | 3240 | 9.2 | 53 | |
| 9 | C-41 FixerWash | Diamond | 100 | 14400 | 4320 | 6.6 | 51 | 2 |
| Comp. C | C-41 FixerWash | Pt | 100 | 0 | 0 | 16 | 255 | |
| Comp C | C-41 FixerWash | Pt | 100 | 3600 | 4320 | 13 | 103 | |
| Comp C | C-41 FixerWash | Pt | 100 | 10800 | 12960 | 11 | 64 | |
| Comp C | C-41 FixerWash | Pt | 100 | 18000 | 21600 | 11 | 51 | |
| Comp C | C-41 FixerWash | Pt | 100 | 21780 | 26136 | 12 | 51 | 160 |
| Comp. D | C-41 FixerWash | Pt | 100 | 0 | 0 | 12 | 258 | |
| Comp. D | C-41 FixerWash | Pt | 100 | 3600 | 4320 | 11 | 72 | |
| Comp. D | C-41 FixerWash | Pt | 100 | 7200 | 8640 | 11 | 65 | |
| Comp. D | C-41 FixerWash | Pt | 100 | 10800 | 12960 | 11 | 61 | |
| Comp. D | C-41 FixerWash | Pt | 100 | 14400 | 17280 | 11 | 53 | 150 |
| 10 | C-41 BleachWash | Diamond | 100 | 0 | 0 | 100 | 440 | |
| 10 | C-41 BleachWash | Diamond | 100 | 2700 | 810 | 72 | 345 | |
| 10 | C-41 BleachWash | Diamond | 100 | 7200 | 2160 | 47 | 257 | |
| 10 | C-41 BleachWash | Diamond | 100 | 10800 | 3240 | 38 | 150 | |
| 10 | C-41 BleachWash | Diamond | 100 | 14400 | 4320 | 29 | 133 | 1 |
| 11 | C-41 BleachWash | Diamond | 100 | 0 | 0 | 93 | 396 | |
| 11 | C-41 BleachWash | Diamond | 100 | 3600 | 1080 | 63 | 333 | |
| 11 | C-41 BleachWash | Diamond | 100 | 7200 | 2160 | 49 | 215 | |
| 11 | C-41 BleachWash | Diamond | 100 | 10800 | 3240 | 40 | 180 | |
| 11 | C-41 BleachWash | Diamond | 100 | 14400 | 4320 | 28 | 172 | <1 |
| Comp. E | C-41 BleachWash | Pt | 100 | 0 | 0 | 118 | 582 | |
| Comp. E | C-41 BleachWash | Pt | 100 | 3600 | 4320 | 110 | 453 | |
| Comp. E | C-41 BleachWash | Pt | 100 | 7200 | 8640 | 103 | 426 | |
| Comp. E | C-41 BleachWash | Pt | 100 | 10800 | 12960 | 97 | 409 | |
| Comp. E | C-41 BleachWash | Pt | 100 | 14400 | 17280 | 92 | 381 | 66 |
| Comp. F | C-41 BleachWash | Pt | 100 | 0 | 0 | 119 | 489 | |
| Comp. F | C-41 BleachWash | Pt | 100 | 3600 | 4320 | 100 | 375 | |
| Comp. F | C-41 BleachWash | Pt | 100 | 7200 | 8640 | 91 | 342 | |
| Comp. F | C-41 BleachWash | Pt | 100 | 10800 | 12960 | 87 | 357 | |
| Comp. F | C-41 BleachWash | Pt | 100 | 14400 | 17280 | 88 | 361 | 110 |
| 12 | GraphicsFixWash | Diamond | 100 | 0 | 0 | 86 | 936 | |
| 12 | GraphicsFixWash | Diamond | 100 | 3000 | 900 | 70 | 761 | |
| 12 | GraphicsFixWash | Diamond | 100 | 7800 | 2340 | 54 | 664 | |
| 12 | GraphicsFixWash | Diamond | 100 | 10200 | 3060 | 44 | 631 | |
| 12 | GraphicsFixWash | Diamond | 100 | 14400 | 4320 | 34 | 535 | 1 |
| 13 | GraphicsFixWash | Diamond | 100 | 0 | 0 | 86 | 898 | |
| 13 | GraphicsFixWash | Diamond | 100 | 3600 | 1080 | 71 | 866 | |
| 13 | GraphicsFixWash | Diamond | 100 | 7200 | 2160 | 56 | 714 | |
| 13 | GraphicsFixWash | Diamond | 100 | 10800 | 3240 | 43 | 707 | |
| 13 | GraphicsFixWash | Diamond | 100 | 14400 | 4320 | 31 | 661 | 2 |
| Comp. G | GraphicsFixWash | Pt | 100 | 0 | 0 | 98 | 893 | |
| Comp. G | GraphicsFixWash | Pt | 100 | 1200 | 1440 | 87 | 841 | |
| Comp. G | GraphicsFixWash | Pt | 100 | 8100 | 9720 | 84 | 821 | |
| Comp. G | GraphicsFixWash | Pt | 100 | 10800 | 12960 | 80 | 797 | |
| Comp. G | GraphicsFixWash | Pt | 100 | 14400 | 17280 | 77 | 730 | 180 |
| Comp. H | GraphicsFixWash | Pt | 100 | 0 | 0 | 97 | 936 | |
| Comp. H | GraphicsFixWash | Pt | 100 | 3600 | 4320 | 91 | 854 | |
| Comp. H | GraphicsFixWash | Pt | 100 | 7200 | 8640 | 85 | 711 | |
| Comp. H | GraphicsFixWash | Pt | 100 | 10800 | 12960 | 83 | 728 | |
| Comp. H | GraphicsFixWash | Pt | 100 | 14400 | 17280 | 80 | 651 | |

EXAMPLE 14

Electrolysis of phenol 60 mL of an aqueous solution, consisting of about 1500 ppm phenol in a 0.5 molar sodium sulfate, was circulated through the electrochemical flow cell cell by means of a peristaltic pump at a rate of 200 mL per minute. The mixture was electrolyzed under a constant current of 310 mA. The apparent surface area of the diamond anode was 3.1 cm$^2$, resulting in a current density of 100 mA/cm$^2$. The cell voltage at this current density was about 3.2 V. During a time period of 18 hours 17,800 coulombs were passed through the solution. The performance of the electrode was determined by measuring the decrease in chemical oxygen demand (COD) and dissolved organic carbon (DOC) as a function of the charge passed. The initial values of COD and DOC were 3572 and 941 ppm, respectively. At the completion of the electrolysis, the COD was reduced by 94%, and the DOC was reduced by 93%.

EXAMPLE 15

Electrolysis of phenol in the presence of halides 120 mL of an aqueous solution, consisting of about 1500 ppm phenol in a 0.5 molar sodium sulfate, was circulated through the electrochemical flow cell by means of a peristaltic pump at a rate of 100 mL per minute. The mixture was electrolyzed under a constant current of 155 mA. The apparent surface area of the diamond anode was 3.1 cm$^2$, resulting in a current density of 50 mA/cm$^2$. The cell voltage at this current density was about 4.5 V. During a time period of 20 hours 10,730 coulombs were passed through the solution. The performance of the electrode was determined by measuring the decrease in chemical oxygen demand (COD) and dissolved organic carbon (DOC) as a function of the charge passed. The initial values of COD and DOC were 3,812 and 850 ppm, respectively. At the completion of the electrolysis, the COD and DOC were both reduced by 92%. During the electrolysis a small amount of solid residue was separated from the liquid by filtration and was analyzed by mass spectrometry (MS). Analysis of the solid by MS showed only the presence of inorganic material containing sodium ion; no organic residue was detected using three MS techniques including electron impact, field desorption and fast atom bombardment.

EXAMPLE 16

Electrolysis of hydroquinone 60 mL of about 14,250 ppm hydroquinone in a 0.5 molar sodium sulfate, was circulated through the electrochemical flow cell by means of a peristaltic pump at a rate of 100 mL per minute. The mixture was electrolyzed under a constant current of 150 mA. The apparent surface area of the diamond anode was 3.0 cm$^2$, resulting in a current density of 50 mA/cm$^2$. The cell voltage at this current density was about 4.5 V. During a time period of 38 hours 20,050 coulombs were passed through the solution. The performance of the electrode was determined by measuring the decrease in chemical oxygen demand (COD) as a function of the charge passed. The initial value of 23,531 ppm COD was reduced by 97% during the electrolysis.

EXAMPLES 17-23 AND COMPARATIVE EXAMPLES J-O

Oxidation of Aminocarboxylic acid Chelates in Dilute Solutions

The electrochemical flow cell was used in constant current mode to electrolyze solutions of the tetrasodium salt of ethylenediaminetetraacetic acid (Na$_4$EDTA), the pentasodium salt of diethylenetriaminepentaacetic acid (antical 8), the tetrasodium salt of 1,3-propylenediaminetetraacetic acid (1,3-PDTA), the tetrasodium salt of 2-hydroxy-1,3-propylenediaminetetraacetic acid (antical 3), and the trisodium salt of nitrilotriacetic acid (NTA), all in 0.5M Na$_2$SO$_4$, aqueous solutions. The structures of those chelates are as follows:

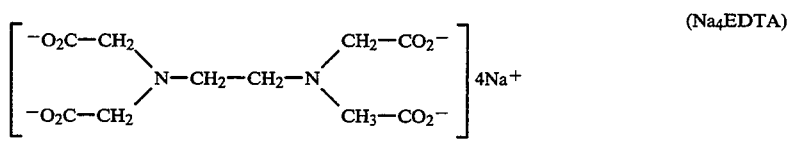
(Na$_4$EDTA)

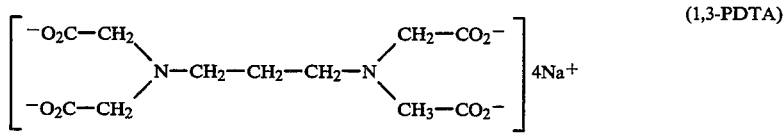
(1,3-PDTA)

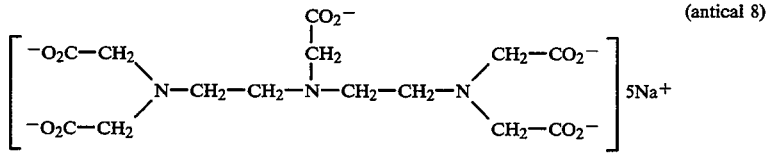
(antical 8)

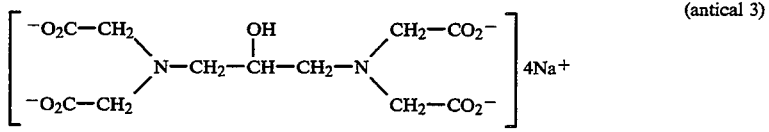
(antical 3)

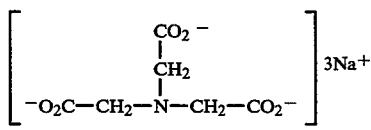
(NTA)

Starting concentrations of the test solutions were measured as Dissolved Organic Carbon (DOC) in the range of 300 to 600 ppm as carbon as determined with a Dohrmann (UV/Persulfate) DC-180 Carbon Analyzer. 40 ml portions of the solutions were recirculated through the flow cell at a flow rate of 200 ml/min. A current density of 100 mA/cm$^2$ was chosen as a standard for comparison with other electrode materials. The applied current was 300mA and the voltage measured between the anode and cathode was in the range of 5 to 7 volts and usually about 6 volts. A 1 ml sample was taken of the stock solution before any current was applied to the cell and served as a starting point for measurement of DOC. The current was applied and the progress of the reaction monitored by taking three more samples during the electrolysis at various time intervals and one sample at the conclusion of the experiment to establish the time concentration profile for kinetic analysis. A kinetic analysis of the DOC data as a function of time indicates first order behavior for loss of DOC. As a result one can predict the concentration of a solution being treated at any given time with the appropriate operating parameters.

Identical tests were conducted, except that the Pt-on-Ti anode was employed for purposes of comparison. In every case the energy efficiency for removal of DOC at typical current density was significantly better for the doped diamond anode.

Results are presented in Table IV, below.

TABLE IV

| Example | Solute | Anode | Current Density (mA/cm$^2$) | Time (secs) | Coulombs | DOC (ppm) | Pt (ng/ml) |
|---|---|---|---|---|---|---|---|
| 17 | Na$_4$EDTA | Diamond | 100 | 0 | 0 | 484 | |
| 17 | Na$_4$EDTA | Diamond | 100 | 900 | 220 | 408 | |
| 17 | Na$_4$EDTA | Diamond | 100 | 2700 | 810 | 295 | |
| 17 | Na$_4$EDTA | Diamond | 100 | 4500 | 1350 | 210 | |
| 17 | Na$_4$EDTA | Diamond | 100 | 7200 | 2160 | 129 | 23 |
| 18 | Na$_4$EDTA | Diamond | 100 | 0 | 0 | 449 | |
| 18 | Na$_4$EDTA | Diamond | 100 | 900 | 220 | 394 | |
| 18 | Na$_4$EDTA | Diamond | 100 | 2700 | 810 | 281 | |
| 18 | Na$_4$EDTA | Diamond | 100 | 4500 | 1350 | 176 | |
| 18 | Na$_4$EDTA | Diamond | 100 | 7200 | 2160 | 96 | 31 |
| Comp. J | Na$_4$EDTA | Pt | 100 | 0 | 0 | 476 | |
| Comp. J | Na$_4$EDTA | Pt | 100 | 900 | 1080 | 372 | |
| Comp. J | Na$_4$EDTA | Pt | 100 | 2700 | 3240 | 230 | |
| Comp. J | Na$_4$EDTA | Pt | 100 | 4500 | 5400 | 152 | |
| Comp. J | Na$_4$EDTA | Pt | 100 | 7200 | 8640 | 74 | |
| Comp. K | Na$_4$EDTA | Pt | 100 | 0 | 0 | 475 | |
| Comp. K | Na$_4$EDTA | Pt | 100 | 900 | 1080 | 355 | |
| Comp. K | Na$_4$EDTA | Pt | 100 | 2700 | 3240 | 208 | |
| Comp. K | Na$_4$EDTA | Pt | 100 | 4500 | 5400 | 124 | |
| Comp. K | Na$_4$EDTA | Pt | 100 | 7200 | 8640 | 60 | |
| 19 | 1,3PDTA | Diamond | 100 | 0 | 0 | 418 | |
| 19 | 1,3PDTA | Diamond | 100 | 900 | 270 | 347 | |
| 19 | 1,3PDTA | Diamond | 100 | 2700 | 810 | 243 | |
| 19 | 1,3PDTA | Diamond | 100 | 4500 | 1350 | 159 | |
| 19 | 1,3PDTA | Diamond | 100 | 7200 | 2160 | 55 | 18 |
| Comp. L | 1,3PDTA | Pt | 100 | 0 | 0 | 453 | |
| Comp. L | 1,3PDTA | Pt | 100 | 900 | 1080 | 353 | |
| Comp. L | 1,3PDTA | Pt | 100 | 2700 | 3240 | 237 | |
| Comp. L | 1,3PDTA | Pt | 100 | 4500 | 6480 | 159 | |
| Comp. L | 1,3PDTA | Pt | 100 | 7200 | 8640 | 84 | 1750 |
| 20 | Antical #3 | Diamond | 100 | 0 | 0 | 381 | |
| 20 | Antical #3 | Diamond | 100 | 1800 | 540 | 236 | |
| 20 | Antical #3 | Diamond | 100 | 3600 | 1080 | 147 | |
| 20 | Antical #3 | Diamond | 100 | 5100 | 1530 | 98 | |
| 21 | Antical #3 | Diamond | 100 | 0 | 0 | 374 | |
| 21 | Antical #3 | Diamond | 100 | 900 | 270 | 303 | |
| 21 | Antical #3 | Diamond | 100 | 2700 | 810 | 203 | |
| 21 | Antical #3 | Diamond | 100 | 4500 | 1350 | 143 | |
| 21 | Antical #3 | Diamond | 100 | 7200 | 2160 | 54 | 3 |
| Comp. M | Antical #3 | Pt | 100 | 0 | 0 | 385 | |
| Comp. M | Antical #3 | Pt | 100 | 900 | 1080 | 261 | |
| Comp. M | Antical #3 | Pt | 100 | 2700 | 3240 | 141 | |
| Comp. M | Antical #3 | Pt | 100 | 4500 | 5400 | 74 | |
| Comp. M | Antical #3 | Pt | 100 | 7200 | 8640 | 27 | 790 |
| 22 | Antical #8 | Diamond | 100 | 0 | 0 | 340 | |
| 22 | Antical #8 | Diamond | 100 | 900 | 270 | 225 | |
| 22 | Antical #8 | Diamond | 100 | 2700 | 810 | 225 | |
| 22 | Antical #8 | Diamond | 100 | 4500 | 1350 | 119 | |
| 22 | Antical #8 | Diamond | 100 | 7200 | 2160 | 36 | 14 |
| Comp. N | Antical #8 | Pt | 100 | 0 | 0 | 417 | |
| Comp. N | Antical #8 | Pt | 100 | 900 | 1080 | 322 | |

TABLE IV-continued

| Example | Solute | Anode | Current Density (mA/cm$^2$) | Time (secs) | Coulombs | DOC (ppm) | Pt (ng/ml) |
|---------|--------|-------|------|------|------|------|------|
| Comp. N | Antical #8 | Pt | 100 | 2700 | 3240 | 185 | |
| Comp. N | Antical #8 | Pt | 100 | 4500 | 6480 | 101 | |
| Comp. N | Antical #8 | Pt | 100 | 7200 | 8640 | 50 | 1730 |
| 23 | NTA | Diamond | 100 | 0 | 0 | 519 | |
| 23 | NTA | Diamond | 100 | 900 | 270 | 448 | |
| 23 | NTA | Diamond | 100 | 2700 | 810 | 330 | |
| 23 | NTA | Diamond | 100 | 4500 | 1350 | 220 | |
| 23 | NTA | Diamond | 100 | 7200 | 2160 | 147 | 4 |
| Comp. O | NTA | Pt | 100 | 0 | 0 | 501 | |
| Comp. O | NTA | Pt | 100 | 900 | 1080 | 376 | |
| Comp. O | NTA | Pt | 100 | 2700 | 3240 | 210 | |
| Comp. O | NTA | Pt | 100 | 4500 | 5400 | 119 | |
| Comp. O | NTA | Pt | 100 | 7200 | 8640 | 73 | 435 |

EXAMPLE 24

Electrolyses of Na$_4$EDTA as a Function of Flow Rate

In order to obtain information concerning the effect of mass transfer on the electrolysis of aminocarboxylate solutes, a study involving the determination of current efficiency as a function of flow rate was performed. 40 ml portions of the same type of Na$_4$EDTA solution employed in Examples 17 and 18 were treated in the doped diamond anode electrochemical flow cell in the same manner as in Examples 17 and 18, except that the flow rate of the solution was 50 ml/min in one test and 100 ml/min in another test (rather than the 200 ml/min flow rate of Examples 17 and 18). The kinetic data at the different flow rates showed little variation in current efficiency and indicate a kinetically controlled series of oxidation reactions with minimal contribution from mass transfer. With a mass transfer controlled process one expects significant changes in efficiency as a function of flow rate and turbulence. Our measurements show very little dependence of current efficiency on flow rate and support the assertion that the electrolysis of aminocarboxylate solutes is a kinetically controlled process.

EXAMPLES 25-30 AND COMPARATIVE EXAMPLES P-Q

Effect of Current Density on Electrolyses of Na$_4$EDTA

In order to determine the effect of current density on the progress of electrolytic oxidation of aminocarboxylic acid chelates, a series of tests was performed in which the current density, under constant current conditions, was varied while all other variables were held constant. 40 ml portions of the same type of Na$_4$EDTA solution employed in Examples 17 and 18 were treated in the doped diamond anode electrochemical flow cell and in the comparative Pt-on-Ti anode flow cell in the same manner as in Example 17 and 18 and Comparative Examples J and K, respectively, except that instead of employing a 100 mA/cm$^2$ current density, tests were run at current densities of 50, 200, 400, and 800 mA/cm$^2$.

In every case the inventive method yielded little variation in energy efficiency at different current densities, and there was no energy disadvantage in the inventive method at higher-than-typical current densities. In contrast, the comparative tests at 50 and 200 mA/cm$^2$ again showed much less energy efficiency. At 400 and 800 mA/cm$^2$ a Pt-on-Ti anode would show even more significant decreases in efficiency, because extreme amounts of gas would be generated.

Results are presented in Table V, below.

TABLE V

| Example | Solute | Anode | Current Density (mA/cm$^2$) | Time (secs) | Coulombs | DOC (ppm) | Pt (ng/ml) |
|---------|--------|-------|------|------|------|------|------|
| 25 | Na$_4$EDTA | Diamond | 50 | 0 | 0 | 502 | |
| 25 | Na$_4$EDTA | Diamond | 50 | 3600 | 540 | 348 | |
| 25 | Na$_4$EDTA | Diamond | 50 | 10800 | 1620 | 137 | |
| 25 | Na$_4$EDTA | Diamond | 50 | 18000 | 2700 | 123 | |
| 25 | Na$_4$EDTA | Diamond | 50 | 21600 | 3240 | 64 | |
| 26 | Na$_4$EDTA | Diamond | 50 | 0 | 0 | 483 | |
| 26 | Na$_4$EDTA | Diamond | 50 | 900 | 135 | 448 | |
| 26 | Na$_4$EDTA | Diamond | 50 | 2700 | 405 | 359 | |
| 26 | Na$_4$EDTA | Diamond | 50 | 4500 | 675 | 271 | |
| 26 | Na$_4$EDTA | Diamond | 50 | 7200 | 1080 | 144 | |
| Comp. P | Na$_4$EDTA | Pt | 50 | 0 | 0 | 420 | |
| Comp. P | Na$_4$EDTA | Pt | 50 | 1500 | 900 | 331 | |
| Comp. P | Na$_4$EDTA | Pt | 50 | 3300 | 1980 | 263 | |
| Comp. P | Na$_4$EDTA | Pt | 50 | 7200 | 4320 | 160 | |
| Comp. P | Na$_4$EDTA | Pt | 50 | 10800 | 6480 | 85 | |
| 27 | Na$_4$EDTA | Diamond | 200 | 0 | 0 | 476 | |
| 27 | Na$_4$EDTA | Diamond | 200 | 900 | 540 | 337 | |
| 27 | Na$_4$EDTA | Diamond | 200 | 2200 | 1620 | 122 | |
| 27 | Na$_4$EDTA | Diamond | 200 | 4500 | 2700 | 39 | 16 |
| 28 | Na$_4$EDTA | Diamond | 200 | 0 | 0 | 322 | |
| 28 | Na$_4$EDTA | Diamond | 200 | 1200 | 720 | 111 | |
| 28 | Na$_4$EDTA | Diamond | 200 | 3600 | 2160 | 48 | |

TABLE V-continued

| Example | Solute | Anode | Current Density (mA/cm²) | Time (secs) | Coulombs | DOC (ppm) | Pt (ng/ml) |
|---|---|---|---|---|---|---|---|
| Comp. Q | Na₄EDTA | Pt | 200 | 0 | 0 | 361 | |
| Comp. Q | Na₄EDTA | Pt | 200 | 600 | 1440 | 252 | |
| Comp. Q | Na₄EDTA | Pt | 200 | 1800 | 4320 | 119 | |
| Comp. Q | Na₄EDTA | Pt | 200 | 2700 | 6480 | 72 | |
| Comp. Q | Na₄EDTA | Pt | 200 | 3600 | 8640 | 47 | 1010 |
| 29 | Na₄EDTA | Diamond | 400 | 0 | 0 | 470 | |
| 29 | Na₄EDTA | Diamond | 400 | 900 | 1080 | 352 | |
| 29 | Na₄EDTA | Diamond | 400 | 1800 | 2160 | 270 | |
| 29 | Na₄EDTA | Diamond | 400 | 3600 | 4320 | 137 | |
| 29 | Na₄EDTA | Diamond | 400 | 5400 | 6480 | 76 | |
| 29 | Na₄EDTA | Diamond | 400 | 7200 | 8640 | 52 | 21 |
| 30 | Na₄EDTA | Diamond | 800 | 0 | 0 | 421 | |
| 30 | Na₄EDTA | Diamond | 800 | 900 | 2160 | 264 | |
| 30 | Na₄EDTA | Diamond | 800 | 1800 | 4320 | 163 | |
| 30 | Na₄EDTA | Diamond | 800 | 3600 | 8640 | 39 | 14 |

EXAMPLES 31-34 AND COMPARATIVE EXAMPLES R-S

Oxidation of Phosphonate-Bearing Chelates

The electrochemical flow cell was employed to electrolyze solutions of two phosphonate-bearing chelates. The chelates are referred to as antical 4 and antical 5, and their structures are as follows:

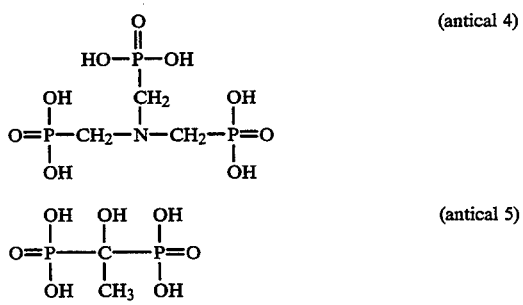

Solutions of antical 4 and antical 5 were diluted with 0.5M Na₂SO₄ to give working solutions with DOC content between 400 and 900 ppm. 40 ml portions of the solutions were flowed through the electrochemical flow cell at a flow rate of approximately 200 ml/min. and were electrolyzed for two hours. The current density at the diamond electrode was 100 mA/cm² assuming a 3cm² electrode area. In order to obtain the 100 mA/cm² current density, the applied current was 300 mA. The temperature of the solution was monitored during the experiment and remained at near 24° C. throughout. The loss of the chelates was monitored by taking samples for DOC analysis. The first sample was taken from the stock solution and provides the starting concentration of organic carbon in the solution. More samples were taken during the electrolysis experiments, and a final sample was taken after the completion of the experiment.

The data was analyzed to determine the net change in DOC resulting from the oxidation of the chelates, and a kinetic analysis showed first order behavior for the loss of DOC. The phosphonate-containing chelates are particularly recalcitrant in oxidizing treatments. In fact, control experiments using a platinized titanium anode showed virtually no decrease in the DOC during the electrolysis of either antical 4 or antical 5, whereas a diamond anode performed well to reduce the DOC of the test solution.

Results are presented in Table VI, below.

TABLE VI

| Example | Solute | Anode | Current Density (mA/cm²) | Time (secs) | Coulombs | DOC (ppm) | Pt (ng/ml) |
|---|---|---|---|---|---|---|---|
| 31 | Antical #4 | Diamond | 100 | 0 | 0 | 435 | |
| 31 | Antical #4 | Diamond | 100 | 900 | 270 | 398 | |
| 31 | Anfical #4 | Diamond | 100 | 2700 | 810 | 309 | |
| 31 | Antical #4 | Diamond | 100 | 4500 | 1350 | 222 | |
| 31 | Antical #4 | Diamond | 100 | 7200 | 2160 | 84 | |
| 32 | Antical #4 | Diamond | 100 | 0 | 0 | 446 | |
| 32 | Antical #4 | Diamond | 100 | 900 | 270 | 399 | |
| 32 | Antical #4 | Diamond | 100 | 2700 | 810 | 311 | |
| 32 | Antical #4 | Diamond | 100 | 4500 | 1350 | 241 | |
| 32 | Antical #4 | Diamond | 100 | 7200 | 2160 | 154 | 4 |
| Comp. R | Antical #4 | Pt | 100 | 0 | 0 | 445 | |
| Comp. R | Antical #4 | Pt | 100 | 900 | 1080 | 432 | |
| Comp. R | Antical #4 | Pt | 100 | 2700 | 3240 | 414 | |
| Comp. R | Antical #4 | Pt | 100 | 4500 | 6480 | 433 | |
| Comp. R | Antical #4 | Pt | 100 | 9000 | 10800 | 447 | 640 |
| 33 | Antical #5 | Diamond | 100 | 0 | 0 | 842 | |
| 33 | Antical #5 | Diamond | 100 | 900 | 270 | 779 | |
| 33 | Antical #5 | Diamond | 100 | 2700 | 810 | 646 | |
| 33 | Antical #5 | Diamond | 100 | 4500 | 1350 | 507 | |
| 33 | Antical #5 | Diamond | 100 | 7200 | 2160 | 318 | 5 |
| 34 | Antical #5 | Diamond | 100 | 0 | 0 | 828 | |
| 34 | Antical #5 | Diamond | 100 | 900 | 270 | 766 | |
| 34 | Antical #5 | Diamond | 100 | 2700 | 810 | 609 | |
| Comp. S | Antical #5 | Pt | 100 | 0 | 0 | 837 | |

TABLE VI-continued

| Example | Solute | Anode | Current Density (mA/cm$^2$) | Time (secs) | Coulombs | DOC (ppm) | Pt (ng/ml) |
|---|---|---|---|---|---|---|---|
| Comp. S | Antical #5 | Pt | 100 | 900 | 1080 | 835 | |
| Comp. S | Antical #5 | Pt | 100 | 2700 | 3240 | 838 | |
| Comp. S | Antical #5 | Pt | 100 | 4500 | 5400 | 847 | |
| Comp. S | Antical #5 | Pt | 100 | 9300 | 11160 | 870 | 265 |

EXAMPLES 35-36 AND COMPARATIVE EXAMPLES T-U

Oxidation of Hydroxycarboxylic acid Chelates

A number of other chelates and related compounds have been electrolytically oxidized to further show the general advantages in current efficiency for electrolytic treatment using boron-doped diamond film anodes over the standard platinized titanium anodes. The compounds, glycolic acid and sodium citrate, have structures as follows:

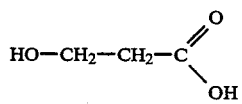
(glycolic acid)

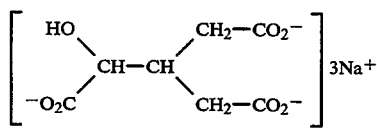
(sodium citrate)

Appropriate amounts of solid glycolic acid and sodium citrate were dissolved in 0.5M Na$_2$SO$_4$ to give working solutions with DOC content between 400 and 600 ppm. 40 ml portions of the solutions were flowed through the electrochemical flow cell at a flow rate of approximately 200 ml/min and were electrolyzed for two hours. The current density at the diamond electrode was 100 mA/cm$^2$ assuming a 3 cm$^2$ electrode area. In order to obtain the 100 mA/cm$^2$ current density the applied current was 300 mA. The temperature of the solution was monitored during the experiment and remained at near 24° C. throughout. The loss of the chelates was monitored by analyzing samples for DOC. The first sample was taken from the stock solution and provided the starting concentration of organic carbon in the solution. More samples were taken during the electrolysis experiments, and a final sample was taken after the completion of the experiment. The data was analyzed to determine the net change in DOC resulting from the oxidation of the chelates, and a kinetic analysis showed first order behavior for the loss of DOC.

Both chelates were destroyed by electrolytic treatment as determined by the loss of DOC. Glycolic acid and sodium citrate were, like antical 4, and 5, recalcitrant to electrolytic treatment with the standard Pt-Ti anode, but were efficiently destroyed using the boron-doped diamond film electrode. Such results further indicate the advantage of using the diamond film electrode for electrolytic treatment of certain compounds, which may not be electrooxidized with other standard electrode materials.

Results are presented in Table VII, below.

TABLE VII

| Example | Solute | Anode | Current Density (mA/cm$^2$) | Time (secs) | Coulombs | DOC (ppm) | Pt (ng/ml) |
|---|---|---|---|---|---|---|---|
| 35 | NaCitrate | Diamond | 100 | 0 | 0 | 506 | |
| 35 | NaCitrate | Diamond | 100 | 900 | 270 | 440 | |
| 35 | NaCitrate | Diamond | 100 | 2700 | 810 | 297 | |
| 35 | NaCitrate | Diamond | 100 | 4500 | 1350 | 190 | |
| 35 | NaCitrate | Diamond | 100 | 7200 | 2160 | 51 | 4 |
| Comp. T | NaCitrate | Pt | 100 | 0 | 0 | 492 | |
| Comp. T | NaCitrate | Pt | 100 | 900 | 1080 | 480 | |
| Comp. T | NaCitrate | Pt | 100 | 2700 | 3240 | 454 | |
| Comp. T | NaCitrate | Pt | 100 | 4500 | 5400 | 464 | |
| Comp. T | NaCitrate | Pt | 100 | 7200 | 8640 | 436 | 260 |
| 36 | Glycolic Acid | Diamond | 100 | 0 | 0 | 527 | |
| 36 | Glycolic Acid | Diamond | 100 | 900 | 270 | 425 | |
| 36 | Glycolic Acid | Diamond | 100 | 2700 | 810 | 241 | |
| 36 | Glycolic Acid | Diamond | 100 | 4500 | 1350 | 130 | |
| 36 | Glycolic Acid | Diamond | 100 | 7200 | 2160 | 63 | 4 |
| Comp. U | Glycolic Acid | Pt | 100 | 0 | 0 | 490 | |
| Comp. U | Glycolic Acid | Pt | 100 | 900 | 1080 | 455 | |
| Comp. U | Glycolic Acid | Pt | 100 | 2700 | 3240 | 391 | |
| Comp. U | Glycolic Acid | Pt | 100 | 4500 | 5400 | 337 | |
| Comp. U | Glycolic Acid | Pt | 100 | 7200 | 8640 | 284 | 320 |

EXAMPLES 37-39 AND COMPARATIVE EXAMPLES V-X

Oxidation of Mono and Dicarboxylic Acids

Several other carboxylate compounds have been electrolycitically oxidized to show the general advantages in energy efficiency for electrolytic treatment using boron-doped diamond film anodes over the standard platinized titanium anodes. The compounds, formic acid, oxalic acid, and malonic acid, were electrolytically oxidized in a manner similar to the electrolyses described above in previous Examples. Again, a planar boron-doped polycrystalline diamond anode was used in conjunction with a planar stainless steel cathode in a newly designed flow cell to electrolyze solutions of several carboxylates. The new cell was designed so that the electrode could be removed easily from the cell after an experiment. The new cell was identical to the Swedish AB microflow cell except for a stainless steel backing plate in which the anode was mounted and a stainless steel cover plate which allowed for the flow of solution between the anode and cathode. A gasket seal was used to isolate the back of the electrode from the test solution and connection of the electrode was made by exerting pressure onto a stainless steel backing plate in which the diamond electrode assembly was fitted. Contact was also made between the back of the anode and the stainless steel backing plate. A wire connection was made to the stainless steel backing plate and to the potentiostat. The anode gasket allowed an area of 2.25 cm$^2$ of the diamond film to be exposed to the test solution. The back of the electrode was coated with electron beam deposited gold in order to prevent oxidation of the Si substrate in case the test solution were to come in contact with the back of the electrode assembly during treatment. The distance between the anode and cathode in the new cell was approximately 7.0 Cm.

The anode was used in constant current mode to electrolyze solutions of formic acid, oxalic acid, and malonic acid. Appropriate amounts of solid formic acid, oxalic acid, and malonic acid were dissolved in 0.5M Na$_2$SO$_4$ to give working solutions with DOC content between 5 and 12 g/L. 100 ml portions of the solutions were recirculated through the flow cell at a flow rate of approximately 200 ml/min and were electrolyzed for ca. eight hours. The current density at the diamond electrode was 100 mA/cm$^2$ assuming a 2.25 cm$^2$ electrode area. In order to obtain the 100 mA/cm$^2$ current density, the applied current was 225 mA. The temperature of the solution was monitored during the experiment and remained at near 24° C. throughout. The loss of the carboxylates was monitored by analyzing samples for COD and DOC.

The first COD sample was taken from the stock solution and provided the starting chemical oxygen demand of the solution. More samples were taken during the electrolysis experiments, and a final sample was taken after the completion of the experiment. The data was analyzed to determine the net change in COD and DOC resulting from the oxidation of the carboxylates, and a kinetic analysis showed first order behavior for the loss of COD. DOC values were determined at the start and finish of the experiments.

All three compounds, formic acid, oxalic acid, and malonic acid, were efficiently destroyed by the inventive electrolytic treatment, as determined by the loss of COD.

In comparative tests carried out in a similar manner, except that platinized titanium was employed as the anode, formic acid and oxalic acid were much less efficiently oxidized.

Malonic acid was, like Glycolic acid, Sodium Citrate, antical 4, and 5, recalcitrant to electrolytic treatment with the standard Pt-Ti anode, but was efficiently destroyed using the boron-doped diamond film electrode. Such results further indicate the advantage of using the diamond film electrode for electrolytic treatment of certain compounds, which may not be electrooxidized to any significant extent with other standard electrode materials.

Results are presented in Table VIII, below.

TABLE VIII

| Example | Solute | Anode | Current Density (mA/cm$^2$) | Time (secs) | Coulombs | DOC (ppm) | COD (ppm) | Pt (ng/ml) |
|---|---|---|---|---|---|---|---|---|
| 37 | FormicAcid | Diamond | 100 | 0 | 0 | 2400 | 3237 | |
| 37 | FormicAcid | Diamond | 100 | 360 | 81 | | 1816 | |
| 37 | FormicAcid | Diamond | 100 | 10800 | 2430 | | 1656 | |
| 37 | FormicAcid | Diamond | 100 | 18000 | 4050 | | 870 | |
| 37 | FormicAcid | Diamond | 100 | 25200 | 5670 | 230 | 309 | |
| Comp. V | FormicAcid | Pt | 100 | 0 | 0 | 2400 | 3402 | |
| Comp. V | FormicAcid | Pt | 100 | 1800 | 2160 | | 2964 | |
| Comp. V | FormicAcid | Pt | 100 | 3600 | 4320 | | 2700 | |
| Comp. V | FormicAcid | Pt | 100 | 7200 | 8640 | | 2385 | |
| Comp. V | FormicAcid | Pt | 100 | 14400 | 17280 | | 1617 | |
| Comp. V | FormicAcid | Pt | 100 | 21600 | 25920 | | 993 | |
| Comp. V | FormicAcid | Pt | 100 | 28800 | 34560 | 330 | 420 | 115 |
| 38 | OxalicAcid | Diamond | 100 | 0 | 0 | 1300 | 857 | |
| 38 | OxalicAcid | Diamond | 100 | 7200 | 1620 | | 465 | |
| 38 | OxalicAcid | Diamond | 100 | 14400 | 3240 | | 322 | |
| 38 | OxalicAcid | Diamond | 100 | 21600 | 4860 | | 196 | |
| 38 | OxalicAcid | Diamond | 100 | 28800 | 6480 | 46 | 183 | |
| Comp. W | OxalicAcid | Pt | 100 | 0 | 0 | 1300 | 916 | |
| Comp. W | OxalicAcid | Pt | 100 | 7200 | 8640 | | 697 | |
| Comp. W | OxalicAcid | Pt | 100 | 14400 | 17280 | | 488 | |
| Comp. W | OxalicAcid | Pt | 100 | 21600 | 25920 | | 354 | |
| Comp. W | OxalicAcid | Pt | 100 | 28800 | 34560 | 310 | 215 | 380 |
| 39 | MalonicAcid | Diamond | 100 | 0 | 0 | 2400 | 4002 | |
| 39 | MalonicAcid | Diamond | 100 | 7200 | 1620 | | 2898 | |
| 39 | MalonicAcid | Diamond | 100 | 14400 | 3240 | | 2001 | |
| 39 | MalonicAcid | Diamond | 100 | 21600 | 4860 | | 1526 | |
| 39 | MalonicAcid | Diamond | 100 | 28800 | 6480 | 550 | 853 | |
| Comp. X | MalonicAcid | Pt | 100 | 0 | 0 | 2100 | 3783 | |
| Comp. X | MalonicAcid | Pt | 100 | 5400 | 6480 | | 4080 | |
| Comp. X | MalonicAcid | Pt | 100 | 12600 | 15120 | | 4155 | |
| Comp. X | MalonicAcid | Pt | 100 | 19800 | 23760 | | 4293 | |
| Comp. X | MalonicAcid | Pt | 100 | 27000 | 22500 | 2300 | 4055 | |

Additional results should be further noted. As previously pointed out, standard anode materials such as Pt can release toxic, non-renewable metal resource materials into solutions, while the doped diamond anodes employed in the inventive method do not. This is illustrated in the data for previous Examples (Tables III–VIII), where a column is provided with the heading "Pt (ng/ml)" to show measurements of the concentration of Pt found in the solutions after the inventive or non-inventive electrolysis. Such measurements were not made in all cases, but where they were, the data shows that only low background amounts of Pt were detected in the solutions treated by the inventive method, while the methods employing a standard platinized titanium anode released considerable amounts of Pt into the solutions treated.

The invention has been described in detail with particular reference to certain preferred embodiments thereof, but it should be appreciated that variations and modifications can be effected within the spirit and scope of the invention.

What is claimed is:

1. A method of treating a solute in a liquid solution in order to render the solution more acceptable for discharge into the environment, comprising electrolyzing the solution with an anode comprising electrically conductive crystalline doped diamond to thereby oxidize the solute.

2. The method of claim 1, wherein the diamond has been doped with boron.

3. The method of claim 1, wherein the doped diamond has less than 100 Ω cm electrical resistivity.

4. The method of claim 1, wherein the doped diamond has less than 0.1 Ω cm electrical resistivity.

5. The method of claim 1, wherein the doped diamond is in the form of a film having a thickness in a range of 3 μm to 1 mm.

6. The method of claim 1, wherein the doped diamond is in the form of a film having a thickness in a range of 10 to 100 μm.

7. The method of claim 1, wherein the anode comprises the doped diamond in the form of a layer on an electrically conductive substrate.

8. The method of claim 7, wherein the conductive substrate has less than 0.1 Ω cm electrical resistivity.

9. The method of claim 7, wherein the conductive substrate comprises a metal that can form conductive metal carbides.

10. The method of claim 7, wherein the conductive substrate selected from the group consisting of molybdenum, tungsten, titanium, copper, cobalt, chromium, nickel, tantalum, zirconium, niobium, doped silicon, and a suboxide of titanium.

11. The method of claim 7, wherein the conductive substrate selected from the group consisting of titanium, tantalum, zirconium, and niobium.

12. The method of claim 7, wherein electrical power is provided to the anode from a power source electrically connected to the conductive substrate.

13. The method of claim 1, wherein the solution is situated in a space between the anode and a cathode, and the distance between the anode and cathode is in a range of 0.1 to 10 mm.

14. The method of claim 13, wherein the distance between the anode and cathode is in a range of 0.1 to 5 mm.

15. The method of claim 1, wherein the treatment is carried out with a current density at a surface of the anode in a range of 1 mA/cm$^2$ to 10 A/cm$^2$.

16. The method of claim 15, wherein the current density is in a range of 20 mA/cm$^2$ to 1 A/cm$^2$.

17. The method of claim 15, wherein the current density is in a range of 50 to 600 mA/cm$^2$.

18. The method of claim 1, wherein the solution is an aqueous solution.

19. The method of claim 1, wherein the solution comprises industrial waste.

20. The method of claim 1, wherein the solution comprises a photoprocessing solution.

21. The method of claim 20, wherein the solution selected from the group consisting of developer, fixer, bleach, bleach-fix, stabilizer, wash-water solution and mixture of any thereof.

22. The method of claim 1, wherein the solute is selected from the group consisting of: a phenol; a hydroquinone; a glycol; a phenylenediamine; a phenidone; an amino alcohol; a hydroxymethylbenzene; a carboxylic acid; a chelating agent comprising a phosphonate, an aminocarboxylic acid, or a hydroxycarboxylic acid; an aldehyde-releasing agent; and mixture of any thereof.

23. The method of claim 1 wherein the solution comprises sodium sulphate as an electrolyte.

* * * * *